(12) United States Patent
Hippeläinen

(10) Patent No.: US 6,229,802 B1
(45) Date of Patent: May 8, 2001

(54) METHOD FOR PACKET SWITCHED DATA TRANSMISSION

(75) Inventor: Leo Hippeläinen, Helsinki (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/443,616

(22) Filed: Nov. 19, 1999

Related U.S. Application Data

(63) Continuation of application No. PCT/FI98/00400, filed on May 12, 1998.

(30) Foreign Application Priority Data

May 13, 1997 (FI) .......................................... 972040

(51) Int. Cl.⁷ .............................. H04J 3/24; H04L 12/28; H04L 12/56; H06J 3/16; H06J 3/22

(52) U.S. Cl. ........................ 370/349; 370/400; 370/468; 455/450

(58) Field of Search ...................................... 370/280, 394, 370/310, 322, 329, 337, 389, 338, 349, 400, 401, 431, 442, 468, 328; 455/509, 450, 517, 524, 555

(56) References Cited

U.S. PATENT DOCUMENTS

| | | | |
|---|---|---|---|
| 5,285,442 | * | 2/1994 | Iwamura et al. ...................... 370/17 |
| 5,583,872 | | 12/1996 | Albrecht et al. . |
| 5,613,069 | * | 3/1997 | Walker ............................. 395/200.15 |
| 5,742,588 | * | 4/1998 | Thornberg et al. .................. 370/236 |
| 5,920,817 | * | 7/1999 | Umeda et al. ....................... 455/437 |

FOREIGN PATENT DOCUMENTS

| | | |
|---|---|---|
| 93/18622 | 9/1993 | (WO) . |
| 96/18248 | 6/1996 | (WO) . |
| 98/38771 | 9/1998 | (WO) . |

* cited by examiner

*Primary Examiner*—Hassan Kizou
*Assistant Examiner*—Duc Ho
(74) *Attorney, Agent, or Firm*—Altera Law Group LLC

(57) ABSTRACT

The invention relates to a method, a network node and a data transmission system for packet-switched data transmission in a data transmission network that comprises at least two network nodes (DXT, BS) for receiving and transmitting packets. The packets (3, 4, 5, 6) sent from the first node (DXT) to the second node (BS) are packets whose destination address indicates the second node as the next node, and the first node (DXT) identifies the destination addresses and data transmission connections (A, B, C, D) associated with the received packets from the identification data contained in each packet. To reduce the risk of a packet not arriving in time, the method comprises reception of a control signal (8) in the first node (DXT), the signal comprising information on the data transmission connection of the packet to be sent next to the second node (BS), and transmission of the packet associated with the data transmission connection indicated by the control signal (8) to the second node (BS).

16 Claims, 2 Drawing Sheets

METHOD FOR PACKET SWITCHED DATA TRANSMISSION

This is a continuation of PCT/F198/00400 filed May 12, 1998.

BACKGROUND OF INVENTION

The invention relates to packet-switched transmission of calls in a situation where the packets have to queue for forwarding, and particularly to packet-switched transmission of calls toward base stations on circuits between a telecommunication network and base stations in a mobile telephone system where a call is forwarded as data packets at even intervals.

In most digital mobile telephone systems the carrier wave of the radio path is divided between several users by using, for example, a TDMA (Time Division Multiple Access) or CDMA (Code Division Multiple Access) method. The common feature of the methods is that a different channel is allocated for each call, and that the call is divided into call packets of a certain length and the packets are transferred on different channels in successive frames transmitted on the carrier wave of the radio path. A frame comprises several channels. In order for a packet to arrive in time at the appropriate frame, the packet has to arrive in time at the base station. In the TDMA method, where a frame consists of time channels that are successive with respect to time, a call packet has to arrive at the base station in time so that it can be transmitted on the correct time channel.

In a packet-switched network the arrival rate and the order of arrival of the packets vary in the network node, for example, with the load of the network nodes encountered on the way, whereby packets arrive in random order, for example, at the network node located before the base station transmitting onto the radio path. The previously known network nodes transmit packets to the base station in the same order in which they arrive at the network node. The order of arrival may not be the appropriate order of transmission in view of the forwarding of the packets from the base station: the call packets must be transmitted onto the radio path at an even rate in the order of channels in accordance with the radio path protocol. The same disadvantageous situation may also arise when the network node transmitting the packets is connected to the rest of the network at a higher rate than the network node receiving the packets is connected to the transmitting network node. The packets will then have to queue at the network node for access to a lower-rate connection, and they are forwarded to the receiving network node in the random order of arrival.

BRIEF DESCRIPTION OF INVENTION

The object of the invention is to solve the above problem and to provide a method that notably reduces the risk of a packet not arriving in time. The method of the invention, in which packets are transmitted from a first node to a second node, is characterized by defining, on the basis of the resource allocation situation of the second node, the order of transmission in which the packets associated with different data transmission connections are to be sent from the first node to the second node; sending the first node a control signal that indicates the order of transmission of the second node; and transmitting the packets associated with the different data transmission connections from the first node to the second node in said order of transmission, until a new control signal is received.

The invention also relates to a method which is characterized by defining, on the basis of the resource allocation situation of the second node, the data transmission connection associated with the packet needed next in the second node; sending the first node a control signal that indicates the data transmission connection associated with the packet to be transmitted next to the second node; and transmitting the packet associated with said data transmission connection from the first node to the second node.

The invention also relates to a network node to which the methods of the invention can be applied. The network node comprises reception means for receiving packets, said reception means being arranged to identify the data transmission connection associated with the packet; transmission means for transmitting the packets toward a destination address; identification means for identifying the destination address and the data transmission connection associated with the packet; and a buffer for buffering the received packets. The network node is characterized by further comprising processing means for receiving a control signal from the data transmission network, said control signal comprising information on the data transmission connection of the packet to be sent next toward a defined destination address; and transmission control means for selecting, in response to the information contained in the control signal, the packet to be sent next to the destination address.

The invention further relates to a packet-switched data transmission system which utilizes wireless data transmission and in which the methods and network node of the invention can be used. The data transmission system comprises at least one base station for transmitting packets on a wireless transmission path, on which a different channel is allocated for each data transmission connection; channel management means for managing the setup, maintenance and set-down of the wireless data transmission connections and for allocating channels for the data transmission connections and for deallocating the channels; and a transmission network for transmitting packets, said network comprising at least one node for transmitting packets to a base station, the node comprising a buffer for buffering the packets to be sent, and the node being arranged to identify, upon receiving the packet, the data transmission connection associated with the packet from the identification data contained in the packet. The data transmission system is characterized in that the channel management means comprise control means for generating a control signal and for transmitting it to the node, the control signal containing information on the data transmission connection of the packet to be sent next to the base station, and the node comprising at least one transmission control means for retrieving packets from the buffer to transmit them to the base station, the transmission control means being arranged to select the packet to be sent next to the base station from the buffer of the node in response to the control signal.

The invention is based on the idea that a network node receives, for example, from a receiving node, information indicating which packet the receiving node wants to receive next, and retrieves the packet indicated by the information from the group of packets waiting for transmission, whereby it is possible to ensure that all the packets arrive in time. The advantage achieved with the invention is that the receiving network node receives exactly the packet it needs to forward. For example, a base station transmitting onto the radio path receives the packet it needs to transmit onto the radio path and the packet will not be late for the transmission slot. Also, the quality of the speech connection remains good. The invention also has the advantage that the delay of the transmission onto the radio path covers the waiting delay in the node and thus need not be taken into account when the transmission delays are calculated. These advantages are achieved both when the order of transmission based on the resource allocation situation of the receiving node is followed continuously and when it is followed one packet at a time.

In a preferred embodiment of the invention, the channel allocation information of the base station is stored in the network node as the order of transmission, which will be followed cyclically. When the channel allocation information changes, the order of transmission will be revised to be in line with the new information. The advantage achieved is that the amount of signalling is reduced in the network, as control signals are transmitted only when the situation changes and as the control signal contains more information. The receiving node, such as a base station, however, receives the packets in the appropriate order.

In a second preferred embodiment of the invention, the control packets that contain signalling information are separated from the call packets. Call packets are sent at certain intervals: in a method that utilizes time division multiplexing, for example, the packets are sent at an interval of the duration of a transmission of a channel on the radio path, and control packets are sent between the call packets, if there is enough time. The advantage achieved is that the transmission capacity can be utilized more efficiently when the less time-critical control packets give priority to the more time-critical call packets. This further enhances the possibility of ensuring that the call packets are at the receiving network node at the correct time.

The preferred embodiments of the method, network node and telecommunication system are disclosed in the attached dependent claims 2 to 5, 7 to 12, 14 and 15.

BRIEF DESCRIPTION OF DRAWINGS

In the following the invention will be described in greater detail by means of preferred embodiments and with reference to the attached drawings, in which.

DETAILED DESCRIPTION OF INVENTION

The invention will now be described by way of an example in a packet-switched telecommunication network that is designed to act as a transmission network of a digital radio network according to the TETRA standard (Trans-European Trunked Radio) defined by the ETSI (European Telecommunications Standards Institute). The TETRA standard defines, for example, a radio interface and other interfaces, such as an interface to another TETRA network. The internal structure of the transmission network, however, has not been standardized. The invention, however, is not limited to radio networks or other wireless networks, but it is obvious to a person skilled in the art that the invention can be applied to other data transmission systems both in networks based on wireless data transmission and in fixed networks.

Figure 1:
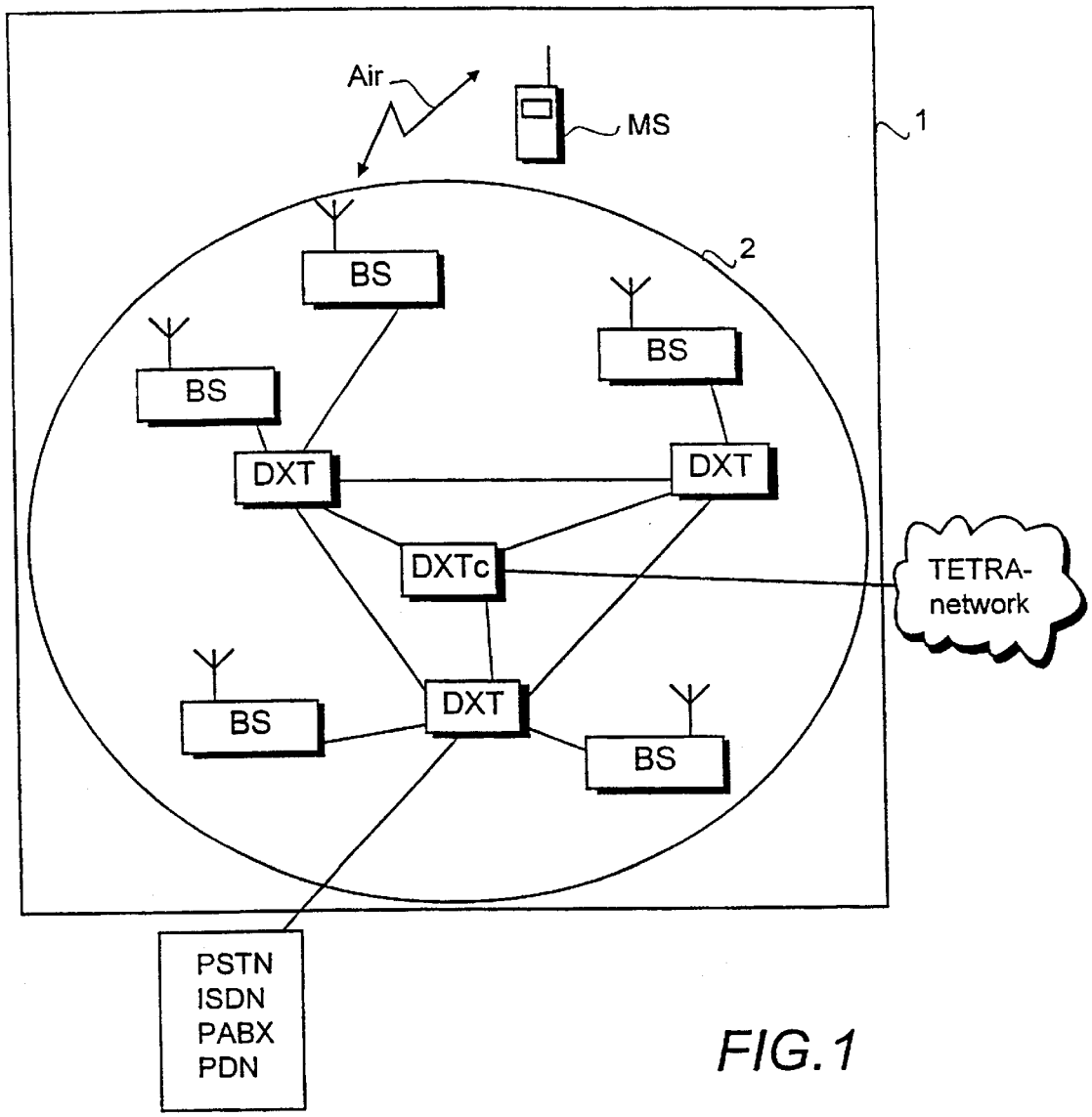
FIG. 1 is a block diagram of a data transmission system according to a first preferred embodiment.

FIG. 1 shows a first preferred embodiment of a data transmission system 1 utilizing wireless data transmission, the system being a system according to the TETRA standard. The data transmission system 1 comprises one or more Mobile Stations MS (Mobile Subscriber) communicating with a Base Station BS over the radio path Air. The data transmission system 1 also comprises one or more base stations BS, each one of which is connected by a circuit to a Digital Exchange DXT for TETRA of a fixed transmission network 2 of the data transmission system 1. The operation of the base station BS and network node DXT of the data transmission system according to the first preferred embodiment will be described in greater detail in connection with FIGS. 2 and 3. The TETRA exchanges DXT are connected by a fixed connection to other exchanges DXT and to a Digital Central Exchange DXTc for TETRA, which is an exchange of the data transmission system 1 and to which are connected other exchanges DXT and/or other central exchanges DXTc so as to provide alternative traffic routes. The interface to another TETRA network is here arranged in the central exchange DXTc, but it can also be located in other exchanges DXT. The external interfaces, defined by the standard, to the Public Switched Telephone Network (PSTN), the Integrated Services Digital Network (ISDN), the Private Automatic Branch Exchange (PABX) and the Packet Data Network (PDN) are here in one exchange DXT, but they can also be arranged, for example, in every exchange. The system according to the TETRA standard also comprises other interfaces and peripherals, which are not shown in the figure. They include, for example, network management systems and dispatcher systems. Although the figure shows several exchanges, only one base station or other receiving network node and one network node through which the packets are forwarded are needed in the system of the present invention. Further, the base stations and the network nodes need not be interconnected by circuits, but they can utilize, for example, wireless data transmission.

Figure 2:
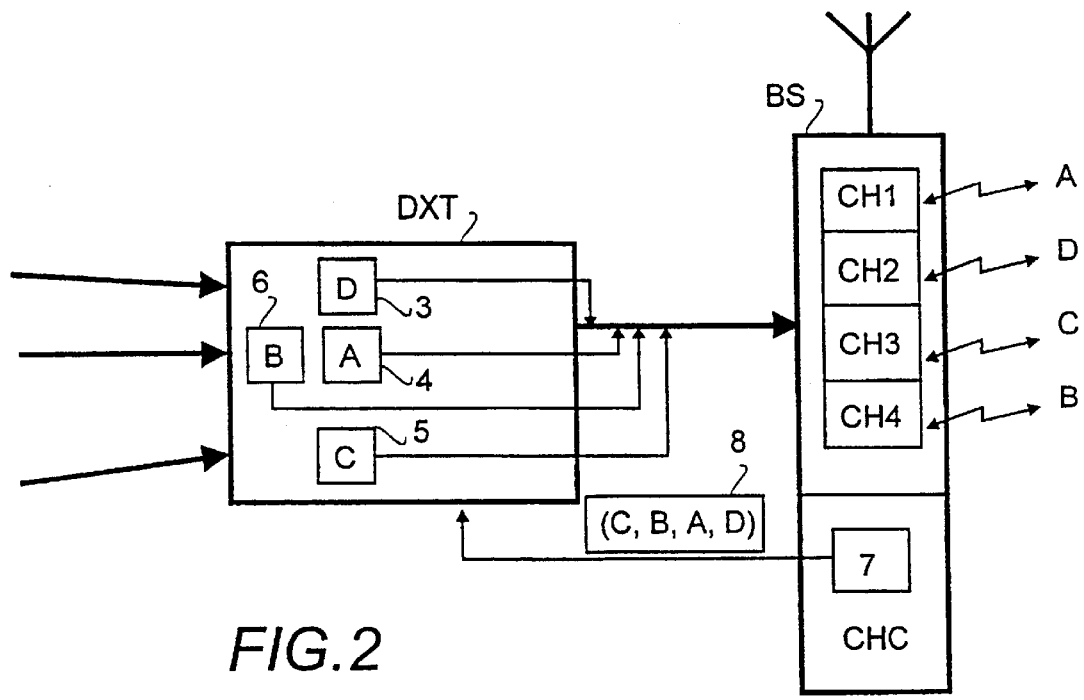
FIG. 2 illustrates the operation according to the first embodiment of the invention in the base station and the network node.

FIG. 2 illustrates the operation of the invention when packets are transmitted from one network node DXT to another network node, which in the example of FIG. 2 is a base station. The network node DXT transmitting packets will be, however, described in greater detail in connection with FIG. 3. The base station BS receiving packets forwards the packets to a mobile station or some other radio unit on the radio path in frames transmitted in succession on a carrier wave. One frame comprises a certain number of channels, and usually one channel is allocated for each connection. On the channel allocated for the connection, one packet associated with the connection is usually transmitted in one frame. In the currently used methods based on dividing a carrier wave into channels, the frames are either TDMA or CDMA frames. The duration of the frame transmission is dependent on the radio system used. For example, in a TETRA system the transmission of one TDMA frame takes about 60 ms, and in narrowband data transmission implemented by the CDMA method the transmission of a frame takes about 20 ms. Since the radio interface according to the TETRA standard is based on a 4-channel time division multiplexed carrier wave, each channel is transmitted in one frame for about 15 ms.

In the first preferred embodiment of the invention illustrated in FIG. 2, a TDMA frame comprises carrier-wave-specific channels CH1, CH2, CH3, CH4, i.e. connections, allocated for connections A, D, C and B, respectively. For the sake of clarity, the allocation situation of only one carrier wave is shown in the figure. One base station can also have many carrier waves. One channel is usually allocated for each connection, but a TETRA radio system allows the allocation of even more channels for one connection. For the sake of clarity, however, it is assumed that one connection reserves one channel. One connection here means either a connection associated with data transmission, or call, or a connection transmitting signalling information between different network elements. A call can be a speech call or a data call. A group call defined in the TETRA standard is one connection, for in the standard one channel is allocated for a group call, and all mobile subscribers of the group listen to the channel allocated.

In the first preferred embodiment illustrated in FIG. 2, the base station BS is connected by a 64 kbit/s transmission channel to a network node that is an exchange DXT of a transmission network of a TETRA system. The network node DXT is connected to the rest of the network at a higher rate, for example, by a 2 Mbits channel. A high-rate transmission channel can be used as parallel 64 kbit/s channels, whereby 32 packets can be sent in parallel, multiplexed with each other. The situation is then the same as when the packets arrive from several directions, whereby they are in random order with respect to one another. The packets associated with the same connection, however, are in chronological order, for they are transmitted in succession and they travel the same distance at the same rate. A high-rate transmission channel can also be used as such without dividing it into parallel channels. In addition, the network node DXT can be connected to the rest of the network by a plural number of channels. The above transmission rates and the number of the channels shown in the figure serve only as an example and are intended only to illustrate the invention.

In FIG. 2, all the channels of the radio path have been allocated. When the last change has been made, i.e. when for example a channel has been allocated for call A, the channel management means CHC have looked for a free channel CH1 and allocated the channel for call A. The channel management means CHC comprise control means 7, which generate a control signal 8 from the new channel allocation information. The control signal 8 in FIG. 2 comprises the identifiers of the connections for which channels have been allocated, preferably in the order in which they are to be sent. The control signal 8 can also comprise other information apart from the channel allocation information and the order of transmission. In FIG. 2, packets are first requested to be sent to connection C, then to connection B, A and D in this order. The control signal can also transmit the channel allocation information and the information on the connection associated with the packet needed first in some other way: for example, by announcing the connections in the order of channels and by separately announcing the connection, or channel, with which the next packet should be associated. In the example of FIG. 2, the control signal could comprise, for example, A, D, C, B, CH3.

The control signal 8 preferably takes account of the time needed to generate and transmit the signal, the time needed to transmit a packet from the network node DXT to the base station BS, and the time that the base station BS may need to process the packet so that it can be forwarded to the radio path. In view of the times mentioned above, the packet associated with the first connection requested is thus the packet that will be needed next at the base station BS. The network node DXT transmitting packets and receiving the control signal can also itself calculate the delays, if it receives, for example in the control signal, information indicating the channel to which the base station BS is transmitting when the control signal is being generated.

The control signal 8 is transmitted to the network node DXT. After receiving the information contained in the control signal 8, the network node DXT preferably stores the information on the connections of the channels located therein in its memory as the order of transmission, and starts to select packets from the received and waiting packets for forwarding in accordance with the connections associated with them in the order C, B, A, D, C, B, A, D, . . . i.e. by cyclically following the order of transmission stored in the memory.

In FIG. 2 the network node DXT has received packets 3, 4 and 5 almost simultaneously. Each packet consists of payload and identification data. The payload is the actual information content of the packet, and the identification data indicates, for example, the destination address of the packet. Upon receiving a packet, the network node DXT identifies the connection associated with the packet from the identification data located in the packet. The essential point is that from the identification data are identified the destination address to which the packet is sent and the data transmission connection that the packet is associated with. In FIG. 2, for example, the destination address, i.e. base station BS, and the data transmission connection D must appear from the identification data of the packet 3. Since in the situation of FIG. 2 the network node DXT knows that the base station BS next wants a packet for connection C, it selects packet 5, associated with data transmission connection C, from packets 3, 4 and 5, which have arrived almost simultaneously. The network node DXT then searches the buffer for a packet associated with connection B. In FIG. 2 packet 6 associated with connection B arrives slightly later than packets 3, 4 and 5 in the network node DXT, which at the very beginning of the reception identifies connection B as being associated with packet 6. If a high-rate transmission channel is used as one high-rate channel, the network node DXT waits until packet 6 has been received and then forwards it. If the channels have the same rate, the forwarding of packet 6 to the base station BS can be started when packet 5 associated with connection C has been transmitted, even if packet 6 has not been received in full. When packet 6 associated with connection B has been transmitted, the network node DXT transmits packet 4 associated with connection A to the base station BS and then packet 3 associated with connection D.

In the first preferred embodiment the control means generate a new control signal when the channel allocation situation changes. When the network node DXT receives the new control signal, it updates the order of transmission and starts to follow the new order. If, for example, call B is terminated, the order of transmission of the new control signal could be, for example, A, D, C, empty. The control signal need not necessarily contain the empty space, but it is advantageous in the first preferred embodiment of the invention, in which a time counter is used to synchronize the transmission of the packets. The synchronization ensures that the packets arrive in time in the receiving network node but wait in the transmitting network node, waiting. The advantage is that a packet that arrives shortly after peak traffic arrives in time, but that a packet arriving late is not waited for for too long, but the other packets are transmitted in time. The operation of the time counter will be described in greater detail in connection with FIG. 3.

The control signal 8 can be generated and transmitted separately each time so that it indicates only the connection for which a packet is needed next in the receiving network node. The network node DXT then transmits one packet at a time and always waits for the control signal before the transmission of the next packet. The control signal 8 can be generated and transmitted separately each time also such that it contains information on several connections associated with packets to be sent in succession, for example a different control signal is sent for each frame. If the control signal contains information to be used only once, the order of transmission is not stored in the memory of the network node DXT. In fact, no memory is the needed in the network node DXT.

In FIG. 2 the channel management means CHC are located in the base station BS. It is a natural solution with respect to transmission onto the radio path, since the channel management means allocate and deallocate channels, managing the set-up, maintenance and set-down of data transmission connections. The channel management means CHC, however, need not be located in the base station BS. The channel management means CHC may equally well be located in the network node DXT, whereby the transmission of the control signal 8 is data transmission internal to the network node, or the channel management means CHC can also be located elsewhere in the network, for example in the network management system or the base station controller, if there is one. The location of the channel management means CHC is not relevant to the invention. In the embodiments of the present invention, it is sufficient that the channel management means CHC contain control means 7 for generating a control signal 8 on the basis of the channel allocation information of the node receiving packets, i.e. on the basis of the order in which the receiving node forwards or otherwise needs the packets. The essential point is that the transmitting network node receives information indicating in which order the receiving network node wants the packets or which packet the network node wants to receive next, not where it receives the information from. The order depends on the resource allocation situation of the receiving network node.

Figure 3:
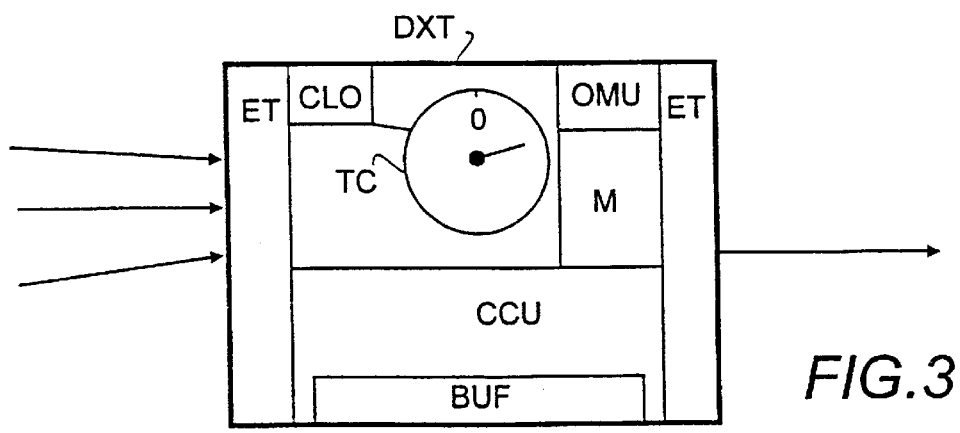
FIG. 3 is a block diagram of a network node according to the first embodiment of the invention.

FIG. 3 is a block diagram illustrating a network node of the invention in the first preferred embodiment, the node being an exchange DXT of a transmission network of the TETRA system. The node can also be any other network node that contains at least so much intelligence that it will not transmit the packets it has received back in the same direction. The node need not process the packet in any way; all it has to do is to forward the packets. For the sake of illustration, the network node is the same node DXT whose operation has been described above in connection with FIG. 2. Three incoming channels thus lead to the network node DXT, and one outgoing channel leads away from it. The only restriction of the number of outgoing and incoming channels of the network node is that the network node must have at least one incoming and at least one outgoing channel. The network node further comprises exchange terminals ET for transmitting and receiving packets from other network nodes or other networks. The network node also comprises a call control unit CCU, the functions of which include call control and resource management. The call control unit CCU also receives the control signal described in greater detail in connection with FIG. 2 and knows how to separate the connection information located therein so as to control the transmission of the packets. The call control unit CCU identifies the connection associated with each received packet from the identification data contained in the packet and controls the transmission of the packets via the exchange terminals ET so that the packets are transmitted in accordance with the information received in the control signal in the order the node receiving the packets needs them. The order is determined by the connection associated with the packet. The call control unit CCU can store the connection information of the control signal in the memory M of the network node DXT as the order of transmission, which is then followed cyclically by the call control unit CCU, as described in greater detail in connection with FIG. 2. If the order of transmission stored in the memory is not needed, the network node need not have memory. The call control unit CCU comprises a buffer BUF to buffer the packets waiting for transmission. The buffer BUF can also be in some other unit of the network node or it can be a separate module. For the functions of the call control unit CCU, the network node can also comprise separate means, such as processing means for receiving control signals and storing the order of transmission from the information contained in the control signal. The above functions can also be divided between different elements of the network node, for example the packet reception means ET can be arranged to identify the connection associated with the packet.

The network node DXT can comprise a clock CLO for the synchronization and the timing of the operation. To the clock can be connected a time counter TC, which resets to zero at predefined intervals and by which the transmission of the packets from the network node DXT can be synchronized. When packets are sent to another network node in the cyclic order of transmission described in greater detail in connection with FIG. 2, the transmissions of the successive packets can be started at a resetting interval of the time counter. The advantage is that it is possible to wait for a packet arriving slightly later than the other packets for a suitable time, but a lacking packet of a connection or a packet arriving much later than the other packets will not be waited for unnecessarily, but when the time counter resets to zero, a packet associated with the next connection will be transmitted. The resetting interval is preferably such that packets are transmitted to a receiving network node at the same rate as the node forwards them. The node thus receives the packets in time and at a correct rate.

If all the channels of the receiving network node have not been allocated, the call control unit CCU controlling the transmission of the packets in the network node DXT needs to know when there is a free time slot that has not been allocated for any connection. There is no associated packets to be sent then, either, and a packet associated with the next connection in the order of transmission need not be transmitted yet. The network node DXT can thereby use the resetting interval of the time counter on the free connection to something else. The free time slot can be stored in the order of transmission. This preferably appears from the control signal, which contains the notification 'empty', rather than connection information, to indicate that the time slot is free. The transmitting network node DXT can also itself define the empty time slot or time slots by comparing the order of transmission in the memory M and the connection information contained in the new control signal received. A lacking connection means a free time slot, i.e. 'empty'.

The network node DXT can also comprise a maintenance unit OMU, which functions as an interface between the network node and the network management system. The maintenance unit OMU sets the resetting interval of the time counter in the network node in accordance with the commands it has received from the network management system. If the network management system generates a control signal, the network node DXT receives it via the maintenance unit.

The reception means ET of the network node DXT can be arranged to separate the call packets and the control packets containing signalling, or control, information on the data transmission network. The call packets contain either speech or data. When a new packet is received in the network node, the reception means ET define on the basis of the identification data contained in the packet whether the packet is a control packet. If the packet is a control packet, the received packet is put in a queue of control packets maintained in the buffer BUF of the network node. If the packet is a call packet, then the packet either waits in the buffer for the transmission moment or the transmission of the packet is started immediately, depending on the order of transmission and on the call associated with the packet. The control packets and the call packets can also be separated by the call control unit CCU, and the control packets need not necessarily be put in a different queue in the buffer BUF, but the call control unit CCU can pick packets on the basis of the identification data from between the call packets. If the control packets are provided with priorities, they are put in a queue in the order of priority or picked from the buffer in accordance with the priority.

If the network node DXT separates the control packets and the call packets, it is advantageous to send call packets at a resetting interval of the time counter, the interval having preferably been set to equal the transmission time of a time slot on the radio path, the time in the TETRA system being about 15 ms. Even in other systems applying the TDMA method it is advantageous to set the resetting interval to equal the transmission time of a time slot on the radio path. During the period between the transmission of the call packet and the resetting of the time counter, control packets are sent. Control packets can also be sent in a free time slot. For example, in a system according to the TETRA standard the payloads of the packets on the radio path are 274 bits and 432 bits. The identification data needed in the transmission network can be presented, for example, by 56 bits, whereby the packet sizes are 330 bits and 488 bits. When the packet size is 488 bits, the transmission of a single call packet on a 64 kbit/s transmission channel takes about 7.6 ms, and so there are about 7.4 ms to send control packets before the next call packet is to be sent.

The duration of the resetting interval can also be equal to some other period of time recurring in the packet-receiving network node. For example, in a CDMA method the control signal can contain information indicating that an associated packet is transmitted toward these connections during a resetting interval of the time counter that is equal in length to the duration of the transmission of a frame.

The attached figures and the description of the figures are intended only to illustrate the present invention and how the invention can be applied to a mobile system. It will be obvious to those skilled in the art that the invention can be varied and modified in many ways without deviating from the scope and spirit of the invention disclosed in the attached claims.

What is claimed is:

1. A method for packet-switched data transmission in a data transmission network comprising at least two network nodes (DXT, BS) for receiving and transmitting packets, the method comprising the steps of receiving, in the first node (DXT), packets associated with at least two different data transmission connections;

identifying, in the first node, the destination addresses and data transmission connections (A, B, C, D) associated with the received packets on the basis of the identification data contained in each packet; and transmitting from the first node (DXT) to the second node (BS) packets (3, 4, 5, 6) containing a destination address on the basis of which the second node is the next node, characterized by the method further comprising the steps of defining, on the basis of the resource allocation situation of the second node (BS), the order of transmission in which the packets associated with different data transmission connections are to be sent from the first node to the second node;

sending the first node (DXT) a control signal that indicates the order of transmission of the second node; and transmitting the packets associated with the different data transmission connections from the first node (DXT) to the second node (BS) in said order of transmission, until a new control signal is received.

2. A method according to claim 1, characterized by re-defining the order of transmission in response to a change in the resource allocation situation of the second node, and sending the first node (DXT) a new control signal in response to the re-defined order of transmission.

3. A method according to claim 1, characterized by maintaining at least one time counter (TC) in the data transmission network, the counter resetting to zero at an interval of a predefined length, separating, in the first node (DXT), call packets and control packets that contain signalling information on the data transmission network, transmitting call packets from the first node (DXT) to the second node (BS) in the order of transmission so that the interval between the starting times of the transmission of two successive packets is at most the same as the resetting interval of the time counter (TC), and transmitting the control packets from the first node (DXT) to the second node (BS) between the call packets.

4. A method according to claim 1, characterized by forwarding the packets from the second node (BS) using time division multiplexing, defining said order of transmission from the allocation information (A, B, C, D) of the channels (CH1, CH2, CH3, CH4) of the second node, and transmitting a control signal (8) in response to a change in the allocation data of the channels (CH1, CH2, CH3, CH4).

5. A method for packet-switched data transmission in a data transmission network comprising at least two network nodes (DXT, BS) for receiving and transmitting packets, the method comprising the steps of receiving, in the first node (DXT), packets associated with at least two different data transmission connections;

identifying, in the first node, the destination addresses and data transmission connections (A, B, C, D) associated with the received packets on the basis of the identification data contained in each packet; and transmitting from the first node (DXT) to the second node (BS) packets (3, 4, 5, 6) containing a destination address on the basis of which the second node is the next node, characterized by the method further comprising the steps of defining, on the basis of the resource allocation situation of the second node (BS), the data transmission connection associated with the packet needed next in the second node (BS);

sending the first node (DXT) a control signal that indicates the data transmission connection associated with the packet to be transmitted next to the second node; and transmitting the packet associated with said data transmission connection from the first node (DXT) to the second node (BS).

6. A method according to claim 5, characterized by the control signal (8) containing, in addition to the data transmission connection of the packet to be transmitted next to the second node (BS), information on the other data transmission connections whose packets are transmitted to the second node (BS), and transmitting the packets (3, 4, 5, 6) associated with the data transmission connections (A, B, C, D) to the second node (BS) in the order indicated by the control signal.

7. A packet-switched network node (DXT) of a data transmission network, the node comprising reception means (ET) for receiving packets, transmission means (ET) for transmitting packets toward a destination address, identification means (CCU) for identifying the destination address and the data transmission connection associated with the packet, and a buffer (BUF) for buffering the received packets, characterized by the node (DXT) further comprising processing means (CCU) for receiving a control signal (8) from the data transmission network, said control signal comprising information on the data transmission connection of the packet to be sent next toward a defined destination address; and transmission control means (CCU) for selecting, in response to the information contained in the control signal (8), the packet to be sent next to the destination address.

8. A network node according to claim 7, characterized in that the processing means (CCU) are arranged to receive the control signal (8), which contains, in addition to the information on the data transmission connection of the packet to be sent next, information on other data transmission connections in the order in which packets are to be sent to them, and the transmission control means (CCU) are arranged to select the packets to be sent and to command the transmission means (ET) to send the packets in the order of transmission indicated by the data contained in the control signal (8).

9. A network node according to claim 7, characterized in that the processing means (CCU) are arranged to store the information contained in the control signal (8) in the memory (M) as the order of transmission and to replace the order of transmission with a new one in response to reception of a new control signal, the transmission control means (CCU) are arranged to select the packets to be transmitted by cyclically following the order of transmission stored in the memory.

10. A network node according to claim 7, characterized in that the network node (DXT) receives a control signal (8) from the node (BS) of the data transmission network to which it transmits a packet.

11. A network node according to claim 7, characterized in that the network node (DXT) receives the control signal from the network management system of the data transmission network.

12. A network node according to claim 7, characterized in that the data transmission network is a mobile network, the network node is a network node transmitting packets to a base station of the mobile network, and the control signal contains the channel allocation information of the base station.

13. A network node according to claim 7, characterized in that the node comprises a time counter (TC), which resets to zero at predefined intervals, the reception means (ET) are arranged to separate call packets and control packets that contain signalling information on the data transmission network, and the call control means (CCU) are arranged to retrieve control packets and to transmit them between the call packets so that the interval between the starting moments of the transmissions of two successive call packets are not longer than the resetting interval of the time counter (TC).

14. A packet-switched data transmission system (1) utilizing wireless data transmission, the system comprising at least one base station (BS) for transmitting packets on a wireless transmission path (Air) in which a different channel is allocated for each data transmission connection, channel management means (CHC) for managing the set-up, maintenance and set-down of the wireless data transmission connections, and for allocating channels for the data transmission connections and for deallocating the channels, and a transmission network (2) for transmitting packets, said network comprising at least one node (DXT) for transmitting packets to a base station (BS), the node (DXT) comprising a buffer (BUF) for buffering the packets to be sent, and the node (DXT) being arranged to identify, upon receiving the packet, the data transmission connection associated with the packet from the identification data contained in the packet, characterized in that the channel management means (CHC) comprise control means (7) for generating a control signal (8) and for transmitting it to the node (DXT), the control signal (8) containing information on the data transmission connection of the packet to be sent next to the base station (BS), and the node (DXT) comprising at least one transmission control means (CCU) for retrieving packets from the buffer (BUF) to transmit them to the base station (BS), the transmission control means (CCU) being arranged to select the packet to be sent next to the base station from the buffer (BUF) of the node in response to the control signal (8).

15. A data transmission system according to claim 14, characterized in that the channel management means (CHC) comprise means for defining the order of transmission from the allocation data (A, B, C, D) of the channels (CH1, CH2, CH3, CH4) of the base station (BS) and for forwarding the information in the control signal (8) to the node (DXT) in response to a change in the channel allocation situation of the base station (BS), the node (DXT) is arranged to store the information contained in the control signal (8) in the memory (M) as the order of transmission and to replace it with new information in response to reception of a new control signal, and the transmission control means (CCU) are arranged to select the packets to be transmitted by cyclically following the order of transmission stored in the memory of the node (DXT).

16. A data transmission system according to claim 14, characterized in that in wireless data transmission, time division multiplexing is used.

* * * * *

UNITED STATES PATENT AND TRADEMARK OFFICE
CERTIFICATE OF CORRECTION

PATENT NO. : 6,229,802 B1 Page 1 of 1
DATED : May 8, 2001
INVENTOR(S) : Hippeläinen It is certified that error appears in the above-identified patent and that said Letters Patent is hereby corrected as shown below:

Title page,
Item [22] Filed, please replace "Nov. 19, 1999" with -- Nov. 10, 1999 --.

Signed and Sealed this

Eighth Day of January, 2002

Attest:

JAMES E. ROGAN
*Attesting Officer*   *Director of the United States Patent and Trademark Office*